United States Patent
Hoess et al.

(10) Patent No.: US 8,759,450 B2
(45) Date of Patent: Jun. 24, 2014

(54) PLASTICS MOULDING COMPOSITIONS, AND MOULDINGS AND PRODUCTION PROCESSES

(75) Inventors: Werner Hoess, Hanau (DE); Klaus Schultes, Wiesbaden (DE); Guomin Liu, Beijing (CN)

(73) Assignee: Evonik Röhm GmbH, Darmstadt (DE)

( * ) Notice: Subject to any disclaimer, the term of this patent is extended or adjusted under 35 U.S.C. 154(b) by 213 days.

(21) Appl. No.: 13/377,579

(22) PCT Filed: Jul. 7, 2009

(86) PCT No.: PCT/CN2009/000771
§ 371 (c)(1),
(2), (4) Date: Dec. 12, 2011

(87) PCT Pub. No.: WO2011/003219
PCT Pub. Date: Jan. 13, 2011

(65) Prior Publication Data
US 2012/0107595 A1    May 3, 2012

(51) Int. Cl.
C08L 33/12 (2006.01)
C08L 51/00 (2006.01)
C08J 5/18 (2006.01)
B29C 45/00 (2006.01)

(52) U.S. Cl.
USPC ........... 525/204; 525/205; 525/212; 525/214; 525/216; 525/221; 525/222; 525/241

(58) Field of Classification Search
USPC ......... 525/221, 222, 204, 205, 212, 214, 216, 525/241
See application file for complete search history.

(56) References Cited

U.S. PATENT DOCUMENTS

| | | | |
|---|---|---|---|
| 4,521,567 A | 6/1985 | Arndt et al. | |
| 5,183,851 A | 2/1993 | Visani et al. | |
| 5,576,385 A | 11/1996 | Tiefensee et al. | |
| 7,456,239 B2 * | 11/2008 | Theil et al. | 524/523 |
| 7,683,131 B2 * | 3/2010 | Goldacker et al. | 525/211 |
| 2007/0055017 A1 * | 3/2007 | Schultes et al. | 525/101 |
| 2008/0132627 A1 * | 6/2008 | Schultes et al. | 524/385 |
| 2010/0324218 A1 * | 12/2010 | Cohen et al. | 525/94 |

FOREIGN PATENT DOCUMENTS

| | | |
|---|---|---|
| CN | 1335872 | 2/2002 |
| CN | 101023130 A | 8/2007 |
| CN | 101107311 A | 1/2008 |
| DE | 44 31 732 A1 | 3/1996 |
| DE | 199 27 769 A1 | 12/2000 |
| JP | 60-60119 A | 4/1985 |
| JP | 10-259286 A | 9/1998 |
| JP | 2006 124608 | 5/2006 |

OTHER PUBLICATIONS

International Search Report Issued Apr. 22, 2010 in PCT/CN09/00771 Filed Jul. 7, 2009.
Extended European Search Report issued Mar. 5, 2013 in European Patent Application No. 09846970.3.
Office Action issued Jul. 8, 2013 in Japanese Patent Application No. 2012-518720 submitting English translation only.
Combined Chinese Office Action and Search Report issued Nov. 18, 2013 in Patent Application No. 200980159918.8 (with English language translation).

* cited by examiner

Primary Examiner — Nathan M Nutter
(74) Attorney, Agent, or Firm — Oblon, Spivak, McClelland, Maier & Neustadt, L.L.P.

(57) ABSTRACT

The present invention relates to a plastics molding composition encompassing at least one poly(meth)acrylate A) and at least one impact-modified poly(meth)acrylate B), wherein the die swell of the plastics molding composition is at least 15%, measured at 5 MPa and 2200C to DIN 54811 (1984), and the melt flow rate of the poly(meth)acrylate A) is at least 10 ml per 10 minutes, measured to ISO 1133 at 2300C with a load of 3.8 kg. The present invention also describes moldings which encompass the plastics molding composition described above, and processes for the production of the said moldings.

17 Claims, No Drawings

PLASTICS MOULDING COMPOSITIONS, AND MOULDINGS AND PRODUCTION PROCESSES

The present invention relates to plastics moulding compositions, mouldings comprising the said plastics moulding compositions, and production processes for the same.

Poly(meth)acrylates feature excellent optical properties, and these plastics are therefore widely used for applications requiring high transparency. The said plastics here exhibit very high resistance to many chemicals, and have high resistance to weathering. However, a disadvantage is relatively low impact resistance in comparison with other plastics. This property is therefore improved by using what are known as impact modifiers, in order to satisfy particular requirements.

Moulding compositions of this type are described by way of example in DE-A 33 00 526, DE-A 33 29 765, EP-A 0 113 924, EP-A 0 465 049, EP-A 0 522 351 and WO 2006/029704.

The requirements placed upon display covers for mobile devices are particularly stringent, since these can be exposed briefly to high mechanical load during everyday use. The surfaces are usually cleaned using alcohol-containing solutions or the like, and the materials must therefore be resistant to these chemicals. Furthermore, optical requirements are very stringent, since haze makes it very difficult to read the information displayed.

Display covers accepted by the market must be capable of production in a highly automated process, for reasons of costs, and injection-moulding processes are therefore the only processes that can be used here. Relatively new processes permit production of mouldings which are ready for installation with no requirement for downstream operations. An example of downstream operations is the removal of sprue. The said techniques use a tunnel gate or a hot-runner die. However, these techniques require a relatively small diameter for the gate. A particular problem is posed here by the increasing miniaturization of mobile devices equipment, leading to very thin display covers, usually with a thickness in the range from 0.5 mm to 1.2 mm.

When the impact-modified plastics moulding compositions described above are used in cost-effective processes for the production of display covers, high haze values arise, sometimes attended by clouding.

In view of the prior art stated and discussed herein, it was therefore an object of the present invention to find plastics moulding compositions which can be moulded via high-efficiency injection-moulding processes to give relatively thin mouldings with an excellent property profile.

In particular, the moulding composition should be capable of processing to give mouldings which have high impact resistance. Furthermore, it should be possible to use conventional cleaning compositions to clean the mouldings obtained from the moulding compositions, and in particular to use alcohol-containing solutions or the like, without any attack on the surface or any formation of what are known as stress cracks. It should moreover be possible to obtain, from the moulding compositions, mouldings which exhibit excellent optical properties, in particular high transparency. The mouldings formed from the moulding compositions should moreover have high surface quality.

Another object can be considered to be the provision of a moulding composition which can be processed using modern injection-moulding processes to give particularly thin mouldings, where the resultant mouldings do not exhibit a high level of haze, or any clouding. A particular feature of modern injection-moulding processes is that the resultant mouldings require no downstream operations before they are used or further processed. The moulding compositions here should be capable of processing with very high cycle rates, without any resultant disadvantages with regard to the quality of the mouldings obtained.

Another object of the present invention is the provision of moulding compositions which can be produced and processed at relatively low cost.

A plastics moulding composition with all of the features of patent Claim 1 achieves these objects, and also achieves other objects which have not been explicitly mentioned but are nevertheless readily derivable or deducible from the circumstances discussed in the introduction above. Advantageous embodiments of the moulding compositions according to the invention are protected by dependent claims.

Accordingly, the present invention provides a plastics moulding composition encompassing at least one poly(meth)acrylate A) and at least one impact-modified poly(meth)acrylate B), characterized in that the die swell of the plastics moulding composition is at least 15%, measured at 5 MPa and 220° C. to DIN 54811 (1984), and the melt flow rate of the poly(meth)acrylate A) is at least 10 ml per 10 minutes, measured to ISO 1133 at 230° C. with a load of 3.8 kg.

Surprisingly, this permits provision of a plastics moulding composition which can, in a very efficient manner, give mouldings having an excellent property profile.

The measures according to the invention can moreover achieve, inter alfa, the following advantages:

The moulding compositions of the present invention can be processed to give mouldings having high impact resistance.

Furthermore, conventional cleaning compositions, in particular alcohol-containing solutions or the like, can be used to clean the mouldings obtained from the moulding compositions, without any affect on the surface or any formation of what are known as stress cracks.

The moulding compositions can moreover give mouldings which exhibit excellent optical properties, in particular high transparency and low haze. The mouldings formed from the moulding compositions moreover have high surface quality.

Furthermore, a moulding composition according to the invention can be processed using modern injection-moulding processes to give particularly thin mouldings, and the resultant mouldings do not exhibit high haze or any clouding. A particular feature of modern injection-moulding processes is that the resultant mouldings require no downstream operations before they can be used or further processed. The moulding compositions here should be capable of processing with very high cycle rates, without any resultant disadvantages with regard to the quality of the mouldings obtained.

The present invention moreover provides moulding compositions which can be produced and processed at low cost.

The plastics moulding composition encompasses at least one poly(meth)acrylate A) whose melt flow rate is at least 10 ml per 10 minutes, preferably at least 15 ml per 10 minutes and particularly preferably at least 20 ml per 10 minutes, measured to ISO 1133 at 230° C. with a load of 3.8 kg. Especially interesting plastics moulding compositions are particularly those using at least one poly(meth)acrylate A) whose melt flow rate is preferably in the range from 10 ml to 50 ml per 10 minutes, particularly preferably in the range from 15 ml to 40 ml per 10 minutes and very particularly preferably in the range from 20 ml to 30 ml per 10 minutes, measured to ISO 1133 at 230° C. with a load of 3.8 kg.

Poly(meth)acrylates are polymers obtainable by polymerizing a monomer mixture which comprises at least 60% by weight, preferably at least 80% by weight, of(meth)acrylate, based on the weight of the monomers. These monomers are well known to persons skilled in the art and are commercially available.

Among these are, inter alia, (meth)acrylic acid and (meth)acrylates derived from saturated alcohols, e.g. methyl(meth)acrylate, ethyl(meth)acrylate, propyl(meth)acrylate, butyl(meth)acrylate, pentyl(meth)acrylate, hexyl(meth)acrylate, 2-ethylhexyl(meth)acrylate, heptyl(meth)acrylate; (meth)acrylates derived from unsaturated alcohols, e.g. oleyl(meth)acrylate, 2-propynyl(meth)acrylate, allyl(meth)acrylate, vinyl(meth)acrylate, etc.; amides and nitriles of (meth)acrylic acid, e.g. N-(3-dimethylaminopropyl)(meth)acrylamide, N-(diethylphosphono)(meth)acrylamide, 1-methacryloylamido-2-methyl-2-propanol; cycloalkyl(meth)acrylates, e.g. 3-vinylcyclohexyl(meth)acrylate, cyclohexyl(meth)acrylate, bornyl(meth)acrylate; hydroxyalkyl(meth)acrylates, e.g. 3-hydroxypropyl(meth)acrylate, 3,4-dihydroxybutyl(meth)acrylate, 2-hydroxyethyl(meth)acrylate, 2-hydroxypropyl(meth)acrylate; glycol di(meth)acrylates, e.g. 1,4-butanediol (meth)acrylate, (meth)acrylates of ether alcohols, e.g. tetrahydrofurfuryl(meth)acrylate, vinyloxyethoxyethyl(meth)acrylate; and polyfunctional(meth)acrylates, e.g. trimethylolpropane tri(meth)acrylate.

Alongside the (meth)acrylates described above, it is also possible to use, for the production of the poly(meth)acrylates, other unsaturated monomers which are copolymerizable with the abovementioned methacrylates. The amount generally used of the said compounds is from 0 to 40% by weight, preferably from 0 to 20% by weight, based on the weight of the monomers, and the comonomers here can be used individually or in the form of a mixture.

Among these are, inter alia, 1-alkenes, e.g. 1-hexene, 1-heptene; branched alkenes, e.g. vinylcyclohexane, 3,3-dimethyl-1-propene, 3-methyl-1-diisobutylene, 4-methyl-1-pentene, vinyl esters, e.g. vinyl acetate; styrene, substituted styrenes having an alkyl substituent in the side chain, e.g. α-methylstyrene and α-ethylstyrene, substituted styrenes having an alkyl substituent on the ring, e.g. vinyltoluene and p-methylstyrene, halogenated styrenes, e.g. monochlorostyrenes, dichlorostyrenes, tribromostyrenes, and tetrabromostyrenes; heterocyclic vinyl compounds, e.g. 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles, and hydrogenated vinylthiazoles, vinyloxazoles and hydrogenated vinyloxazoles; vinyl and isoprenyl ethers; maleic acid derivatives, e.g. maleic anhydride, methylmaleic anhydride, maleimide, methylmaleimide; and dienes, e.g. divinylbenzene.

Preferred poly(meth)acrylates A) are obtainable by polymerizing mixtures which comprise at least 20% by weight, in particular at least 60% by weight and particularly preferably at least 80% by weight, in each case based on the total weight of the monomers to be polymerized, of methyl methacrylate. These polymers are termed polymethyl methacrylates for the purposes of the present invention. Preferred moulding compositions can comprise various poly(meth)acrylates differing by way of example in molecular weight or in monomer constitution.

In particular, it is particularly preferably possible to use a polymethyl methacrylate A) which has at least 90% by weight of units derived from methyl methacrylate and at least 2% by weight of units derived from other (meth)acrylates, based on the weight of the repeat units. In particular, it is possible to use polymethyl methacrylates derived from monomer mixtures which encompass about 92% by weight of methyl methacrylate and about 8% by weight of methyl acrylate.

The weight-average molar mass $M_w$ of the poly(meth)acrylates A) to be used according to the invention can vary widely, and the molar mass here is usually matched to the intended application and to the method used to process the moulding composition. However, it is generally in the range from 10 000 to 180 000 g/mol, preferably from 20 000 to 150 000 g/mol and particularly preferably from 40 000 to 110 000 g/mol, but without any resultant restriction. Poly(meth)acrylates A) whose polydispersity index $M_w/M_n$ is in the range from 1 to 10, particularly preferably in the range from 1.5 to 7 and very particularly preferably from 1.7 to 3, are also of particular interest. Molar mass can be determined by gel permeation chromatography (GPC) against a PMMA standard.

The production of the (meth)acrylate homo- and/or copolymers from the monomers described above, by the various processes of free-radical polymerization, is known per se. The polymers can be produced by bulk polymerization, solution polymerization, suspension polymerization or emulsion polymerization. Bulk polymerization is described by way of example in Houben-Weyl, Volume E20, Part 2 (1987), pp. 1145ff. Useful information with regard to solution polymerization is also found in that publication on pp. 1156ff. Explanations relating to suspension polymerization technology are also found in that publication on pp. 1149ff., while emulsion polymerization is also described and explained in that publication on pp. 1150ff.

Poly(meth)acrylates A) which have the properties described above and which are to be used with preference are inter alia commercially obtainable from Evonik Röhm GmbH with trade mark PLEXIGLAS® and with trade mark ACRYLITE®, and mention may be made here in particular of PLEXIGLAS® POQ62 or ACRYLITE® L40.

A plastic moulding composition according to the invention encompasses not only at least one poly(meth)acrylate A) with the properties described above but also at least one impact-modified poly(meth)acrylate B). The impact-modified poly(meth)acrylate B) is selected in such a way that the die swell of the plastics moulding composition is at least 15%, measured at 5 MPa and 220° C. to DIN 54811 (1984).

Impact-modified poly(meth)acrylates B) which are of a special interest are therefore those which minimize the drop in the die swell of the poly(meth)acrylate A). Impact-modified poly(meth)acrylates B) obtainable by suspension polymerization are among those that exhibit this property.

An impact-modified poly(meth)acrylate B) that can be used with preference is one which is obtainable via an at least two-stage polymerization reaction, where, in a first stage, a hard phase A) with a glass transition temperature Tg >25° C. encompassing at least 70% by weight of methyl methacrylate is produced and then, in a second stage, monomers of the tough phase B), polymers of which have a glass transition temperature Tg of <25° C., are added, and the polymerization reaction is completed, where the polymerization of the hard phase A) in the first stage takes place in the presence a) of an oil-soluble free-radical initiator and b) of an organic sulphur chain transfer agents having at least two thiol groups in the molecule.

Impact-modified poly(meth)acrylates B) with the properties described above are described by way of example in DE-A 33 29 765, filed on Aug. 18, 1983 at the German Patent Office with application number P 3329765.7; reference is made to the said publication for disclosure purposes, and the impact-modified poly(meth)acrylates and processes for their production disclosed therein are incorporated into the present application.

For the production of the impact-modified poly(meth)acrylates B) described above, a hard phase A) with a glass transition temperature Tg >25° C. composed of from 70 to 100% by weight of methyl methacrylate (MMA) and from 0 to 30% by weight of an acrylic ester of a $C_1$-$C_8$ alcohol or of a methacrylic ester of a $C_2$-$C_8$ alcohol and from 0 to 10% by weight of one or more other vinyl monomers copolymerizable with the esters mentioned are preferably polymerized in a first stage.

In a second stage, the monomers of the tough phase B) are added and polymerized. The polymers of the tough phase B) have, regarded independently of the existence of the hard phase, a glass transition temperature Tg <25° C., preferably <10° C.

The polymerization of the hard phase A) in a first stage takes place in the presence a) of an oil-soluble free-radical initiator and b) of an organic sulphur chain transfer agents having at least two thiol groups in the molecule.

According to one preferred aspect, the polymerization of the tough phase B) in the presence of the hard phase A) is carried out by using the monomers to swell the previously formed hard phase A) and therefore polymerizing the monomers of the tough phase in essence within the previously formed hard phase. It is particularly advantageous in this case to carry out the polymerization reaction with the aid of the residual initiator still present in the hard phase.

The glass transition temperature (Tg) can by way of example be found in the following reference: Brandrup and E. H. Immergut, "Polymer Handbook", Interscience 1966, pIII-61 to III-63, or "Kunststoff-Handbuch" [Plastics handbook], Volume IX, edited by R. Vieweg and F. Esser, Carl-Hanser-Verlag, Munich 1975, pp. 333-339, and T. G. Fox in "Bull. Am. Physics soc, Vol. I, (3) p. 123 (1956). The glass transition temperature of the hard phase A) and/or of the tough phase B) can moreover be determined by Differential Scanning calorimetry (DSC), in particular to DIN EN ISO 11357. The glass transition temperature can preferably be determined as midpoint of the glass transition in the second heating curve using a heating rate of 10° C. per minute.

The glass transition temperature Tg of the hard phase polymerized in stage A) (regarded independently of the tough phase) is generally above 25° C., preferably at 60° C. or above.

These values are produced by using from 70 to 100% by weight of methyl methacrylate, and it is possible here to copolymerize from 0 to 30% by weight of an acrylic ester of a $C_1$-$C_8$ alcohol and/or a methacrylic ester of a $C_2$-$C_8$ alcohol.

Examples that may be mentioned of alkyl esters of acrylic acid are methyl acrylate, ethyl acrylate, propyl acrylate, isopropyl acrylate, butyl acrylate, in particular n-butyl and isobutyl acrylate, n-hexylacrylate and 2-ethylhexyl acrylate, and also neopentyl acrylate.

Examples that may be mentioned of alkyl esters of methacrylic acid with $C_2$-$C_8$ alcohols are ethyl methacrylate, n-propyl methacrylate, and butyl methacrylate, in particular n-butyl methacrylate.

The esters mentioned can also be used in the form of mixtures. Examples of other vinyl monomers which can be copolymerized in proportions from 0 to 10% by weight with the esters mentioned have been described above in some detail. It is preferable to use aromatic vinyl compounds, e.g. styrene and its derivatives, e.g. α-methylstyrene or p-methylstyrene, or else vinyl esters of aromatic or aliphatic carboxylic acids, e.g. vinyl acetate or vinyl benzoate, or else acrylonitrile or methacrylonitrile.

The monomers of the tough phase B) have been defined as, in the form of homo- or copolymers (independently of the hard phase) having a glass transition temperature Tg <25° C., preferably <10° C. Esters of methacrylic acid that can be used are the abovementioned esters of $C_2$-$C_3$ alcohols, and esters of acrylic acid that can be used are those of $C_1$-$C_8$ alcohols, also in the form of mixtures.

The sulphur chain transfer agents used having at least two thiol groups in the molecule generally contain at least 2, preferably at least 6, carbon atoms in the molecule, but generally not more than 40. It is advantageous, by way of example, that one, or preferably more, α-mercaptocarboxylic ester(s) is/are present in the molecule, preferably derived from, for example, polyols, e.g. from glycol, from propanediol, from glycerol, from pentaerythritol, etc., and particular mention may be made of pentaerythritol tetrathioglycolate. Partially, the sulphur chain transfer agents having at least 2 thiol groups in the molecule can be represented by the formula (I)

$$HS—CH_2\text{-}A\text{-}CH_2—SH \quad (I),$$

in which A is a hydrocarbon chain having from 3 to 16 carbon atoms, in particular a hydrocarbon chain having from 4 to 8 carbon atoms, or a moiety

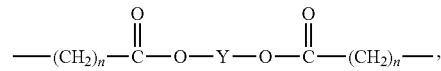

in which n is 0 or a number from 1 to 8, in particular 0, and from 1 to 5, and Y is a hydrocarbon chain having from 2 to 16 carbon atoms, if appropriate substituted having

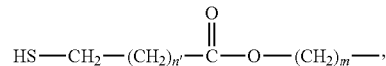

units, in which n' is defined as for n, and m is 0 or a number from 1 to 8.

The content of organic sulphur regulator during the polymerization of the hard phase in stage A) is generally from 0.05 to 5% by weight, preferably from 0.1 to 2% by weight, based on the monomers of the hard phase A).

Examples of oil-soluble (water-insoluble) free-radical initiators a) that can be used are peroxidic and azo compounds of this type (U.S. Pat. No. 2,471,959). Examples that may be mentioned are organic peroxides, e.g. dibenzoyl peroxide, or lauryl peroxide, or peresters, e.g. tert-butyl 2-ethylperhexanoate, and also azo compounds, such as azoisobutyronitrile, and other known initiators of this type. Free-radical generators with higher decomposition temperatures can also be used if, for example, the temperature is raised towards the end of the reaction, in order to maximize completion of the polymerization reaction.

The proportion of the oil-soluble free-radical initiators is generally from 0.01 to 5% by weight, preferably from 0.2 to 3% by weight, particularly preferably from 0.5 to 2.5% by weight, based on the monomers of stage A).

The graft-linking agents preferably used in stage B) are either monomers having at least two polymerizable units of different reactivity within the molecule or monomers having at least three polymerizable units of the same type within the molecule (where the different reactivity of the polyemerizable units which are per se of the same type in the latter case is probably due to the steric hindrance arising during the course of the polymerization reaction from the remaining polymerizable units).

Both types of graft-linking agent (i.e. monomers having at least two polymerizable units or different reactivity within the molecule, and monomers having at least three polymerizable units of the same type within the molecule) improve the clarity of the impact-resistant moulding compositions. The said types of graft-linking agent perform better than other crosslinking agents, e.g. butanediol dimethacrylate, in improving the thermoplastic processability of the material (e.g. its extrudability).

The graft-linking agents preferably used and described above, having at least two polymerizable units of different reactivity can be represented by the general formula II

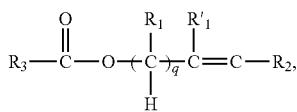

in which $R_1$ and $R_2$ are hydrogen and methyl, $R_3$ is a moiety

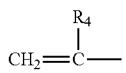

or a moiety

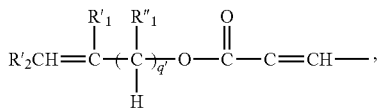

in which $R_4$ is hydrogen or methyl, and q and q' are zero or one, and $R'_1$, $R''_1$ and $R'_2$ are defined as for $R_1$ and, respectively, $R_2$.

Examples that may be mentioned are the allyl, methallyl and crotyl esters of α,β-unsaturated carboxylic acids, e.g. allyl methacrylate and allyl acrylate, and also the corresponding methallyl, crotyl and vinyl esters. Trimethylolpropane triacrylate may be mentioned as an example of graft-linking agents having three polymerizable units of the same type within the molecule.

The impact-modified poly(meth)acrylate B) is preferably obtainable by bead polymerization or by suspension polymerization. The ratio of aqueous to monomer phase can preferably be in the range from 1.5:1 to 4:1 here.

The usual dispersing agents (dispersers) are used during conduct of the bead polymerization reaction; their amounts generally not exceeding a few per cent by weight, based on the aqueous phase. Particular preference is given to what are known as organic dispersers, for example partially hydrolyzed polyvinyl acetate, alkali metal salts of styrene- or vinyl acetate-maleic acid copolymers, and other polymers having hydrophobic and hydrophilic groups in the same polymer molecule.

In order to suppress formation of emulsion polymer, it is also possible to add salt, e.g. sodium chloride, to the aqueous phase. It is also possible to use low-molecular-weight emulsifiers, e.g. sodium salts of alkanesulphonic acids, to improve the stability of the bead suspension.

Bead polymers or suspension polymers of particular interest here are those in which the ratio by weight of monomers used for the production of the hard phase A) to the monomers used for the production of the tough phase B) is preferably in the range from 1:0.15 to 1:3, particularly preferably in the range from 1:0.25 to 1:1.5.

The melt flow rate of the impact-modified poly(meth)acrylate B) is preferably in the range from 0.1 to 5 ml per 10 minutes, particularly preferably in the range from 0.3 to 3 ml per 10 minutes, measured to ISO 1133 at 230° C. with a load of 10 kg.

An impact modifier that can be used with preference as impact-modified poly(meth)acrylate B) can inter alia be obtained commercially from Evonik Röhm GmbH with trade name PLEXIGLAS® zk50.

The moulding compositions can then comprise other polymers alongside the poly(meth)acrylates described above. Among these are by way of example poly(meth)acrylates differing from those described above, poly(meth)acrylimides, polyacrylonitriles, polystyrenes, polyethers, polyesters, polycarbonates, polyvinyl chlorides. Preference is given here to poly(meth)acrylates and poly(meth)acrylimides. These polymers can be used individually or else in the form of a mixture. These polymers can moreover also take the form of copolymers. Preferred copolymers are inter alia styrene-acrylonitrile copolymers, styrene-maleic acid copolymers and polymethyl methacrylate copolymers, in particular polymethyl methacrylate-poly(meth)acrylimide copolymers. However, the proportion of these is restricted to amounts which do not bring about any excessive disadvantages in relation to the advantages according to the invention. The amounts preferably present of these further polymers in the moulding compositions according to the invention are at most up to 40% by weight, particularly preferably up to 30% by weight and very particularly preferably up to 15% by weight.

The compositions to be polymerized, the moulding compositions according to the invention, and/or the mouldings obtainable therefrom, can moreover comprise further well-known additives. Among these additives are, inter alia, chain transfer agents, release agents, anti-setting agents, antioxidants, mould-release agents, flame retardants, lubricants, dyes, flow improvers, fillers, light stabilizers, pigments, weathering stabilizers and plasticizers.

The amount used of the additives is convention, i.e. of up to 50% by weight, preferably up to 10% by weight, based on the total composition. If the amount is greater than 50% by weight, based on the total composition, properties of the plastics can be impaired, an example being processability.

The die swell of the plastics moulding compositions according to the invention is at least 15%, particularly preferably at least 20%, measured at 5 MPa and 220° C. to DIN 54811 (1984). The die swell is in particular influenced by the nature of the impact-modified poly(meth)acrylate B). The die swell is moreover dependent on the proportion of poly(meth)acrylate A) and, respectively, of impact-modified poly(meth)acrylate B). If the proportion of poly(meth)acrylate A) is high, the plastics moulding compositions exhibit high die swell. However, there is a resultant reduction in impact resistance.

Plastics moulding compositions of a special interest are particularly those of the present invention in which the ratio by weight of the poly(meth)acrylate A) to impact-modified poly(meth)acrylate B) is in the range from 10:1 to 1:10, particularly preferably in the range from 2:1 to 1:4 and particularly preferably in the range from 1:1.1 to 1:3.

The plastics moulding composition preferably comprises from 10 to 60% by weight, particularly preferably from 20 to 40% by weight, of poly(meth)acrylate A), and from 40 to 90% by weight, particularly preferably from 55 to 75% by weight of impact-modified poly(meth)acrylate B). According to a further embodiment of the present invention, particular preference is given to moulding compositions composed of from 10 to 60% by weight, particularly preferably from 20 to 40% by weight, of poly(meth)acrylate A), from 40 to 90% by weight, particularly preferably from 55 to 75% by weight, of impact-modified poly(meth)acrylate B) and from 0 to 30% by weight, particularly preferably from 1 to 10% by weight, of additives.

The molecular-weight distribution of the polymers of a plastics moulding composition according to the invention can preferably have at least two maxima, measured by means of GPC.

The melt flow rate of preferred plastics moulding compositions of the present invention can preferably be in the range from 1 to 7 ml per 10 minutes, particularly preferably in the range from 2 to 5 ml per 10 minutes, measured to ISO 1133 at 230° C. with a load of 3.8 kg.

Other plastics moulding compositions of particular interest are those with impact resistance of at least 50 kJ/m$^2$, preferably at least 60 kJ/m$^2$ and particularly preferably at least 100 kJ/m$^2$, measured at 23° C. to ISO 179.

The modulus of elasticity of preferred plastics moulding compositions and, respectively, mouldings obtainable therefrom can be greater than or equal to 1200 MPa, preferably greater than or equal to 1600 MPa, to ISO 527 (at 1 mm/min). The Charpy notched impact resistance of plastics moulding compositions according to the invention and, respectively, mouldings obtainable therefrom can moreover be greater than or equal to 4 kJ/m$^2$, preferably greater than or equal to 6 kJ/m$^2$, to ISO 179.

It is moreover possible to produce plastics with tensile strengths greater than or equal to 30 MPa, preferably greater than or equal to 35 MPa, to ISO 527 (at 1 mm/min), measured at 23° C. and, respectively, 50° C.

The moulding compositions according to the invention can in particular be obtained by compounding of the polymers described above. Here, the polymers are mixed in the melt. The polymers are generally compounded at a temperature in the range from 150 to 350° C., preferably from 220 to 330° C., in an extruder, preferably a twin-screw extruder.

The present invention in particular provides novel mouldings which have an excellent property profile and which are therefore versatile. The present invention accordingly further provides mouldings encompassing a plastics moulding composition according to the invention.

The mouldings according to the invention in particular feature low haze with high impact resistance, and these properties can also be achieved in a moulding with low thickness. The thickness of preferred mouldings can, for example, be in the range from 0.5 to 1.5 mm.

It is particularly surprising that the transmittance $\tau_{D65}$ of the scratch-resistant mouldings can be ≥86%, preferably ≥88%, to DIN 5036 Part 3. The mechanical and/or optical properties listed above for the moulding are not intended to restrict the invention in any way. Instead, the said data serve to describe the particularly outstanding properties of the moulding. The haze of preferred mouldings is preferably at most 1.0%, particularly preferably at most 0.7%, measured to ASTM D1003 at 23° C., and these values apply in particular to mouldings whose thickness is up to 1.5 mm, particularly preferably about 1 mm.

Preferred mouldings are moreover free from cracks and exhibit high chemicals resistance. Preferred mouldings according to the invention exhibit high chemicals resistance to an ethanol/water mixture (70/30), to an NaOH solution (1%) or to sulphuric acid (1%), using an exposure time of at least 30 min, at 23° C.

The mouldings of the present invention can moreover exhibit excellent weathering resistance. Weathering resistance in the xenon test is preferably at least 1000 hours, particularly preferably at least 2000 hours. The small drop in transmittance can, for example, be used to determine this stability. Mouldings of particular interest are particularly those whose transmittance drops by at most 10%, particularly preferably by at most 5%, based on the transmittance value at the start of the irradiation process, after 2000 hours of xenon irradiation.

Particularly preferred mouldings are display covers which in particular cover the displays of small mobile electronic devices, such as mobile phones, smartphones, cameras, MP3 players or the like.

For the purposes of the present invention, the expression plastics moulding composition means that the plastics mixture can be processed thermoplastically, in particular by injection moulding. Injection-moulding processes per se have a long history of use, and the present plastics moulding composition in particular features especially good processability. Accordingly, these plastics moulding compositions can in particular be used in relatively new processes in which the resultant mouldings require no downstream operations. An example of downstream operations is the removal of sprue. These techniques use a tunnel gate or a hot-runner die.

The temperature at which the moulding composition is injected into the injection mould depends in particular on the nature of the polymer, and also on the additives. These processing temperatures are known to the person skilled in the art. The temperature of the moulding composition when it is injected into the injection mould is generally in the range from 150 to 300° C., preferably from 220 to 290° C.

Before the moulding is removed from the mould, the moulding composition can preferably be cooled by setting an appropriate mould temperature, to a temperature in the range from 20 to 130° C., particularly preferably from 30 to 100° C. and very particularly preferably from 35 to 80° C.

Surprisingly, the present plastics moulding compositions can give particularly short injection times here, which in preferred embodiments are in the range from 0.2 to 2 seconds, particularly preferably in the range from 0.3 to 1 s. These values are achieved by way of example for a conventional display format of 40×50×1.2 mm.

Surprisingly, it is possible here to set an injection rate of at least 400 mm/s, particularly preferably at least 600 mm/s, without any adverse effect on the properties of the resultant mouldings. The injection rate here refers to the flow rate of the melt when it flows through the hot-runner die. By way of example, these values can be obtained when using a hot runner with die diameter of 1.5 mm or greater.

Inventive examples and comparative examples will be used below to illustrate the present invention, but with no intended resultant restriction.

COMPARATIVE EXAMPLE 1

A moulding with dimensions 100 mm×100 mm×1 mm is produced by means of an injection mould with high-gloss-polished cavity and hot-runner gate, in an injection-moulding machine from ENGEL. The diameter of the gate was 2 mm, and the injection-moulding machine had an injection unit with a 35 mm×20 D screw.

An impact-modified PMMA moulding composition commercially obtainable with trade mark PLEXIGLAS® zk6HF from Evonik Röhm GmbH was used here. The said moulding composition encompassed about 40% by weight of a core-shell impact modifier which has a structure using two shells and which is obtainable by emulsion polymerization, and about 60% by weight of a polymethyl methacrylate whose melt flow rate is about 21 ml per 10 minutes (230° C./3.8 kg). The product was produced by feeding the components in the stated mixing ratio into a screw-based kneader, which in the present case was a co-rotating ZSK 25 mm twin-screw extruder from W&P.

As described in the data sheets from Evonik Röhm GmbH, PLEXIGLAS® zk6HF is a free-flowing impact-resistant moulding composition which is preferably, and frequently, used for the injection moulding of thin-walled mobile-phone displays and of other applications described above.

To produce the moulding, the moulding composition was heated to a temperature of 260° C. and injected into the mould at a rate of 130 mm/s (screw advance rate). The hold pressure was 1000 bar, the hold-pressure time was 2 s and the cooling time was 8 s.

Haze to ASTM D1003 was measured at 23° C. on the resultant moulding. For comparative purposes, transmittance ($\tau_{D65}$) to DIN 5036 at 23° C. and impact resistance to ISO 179 at 23° C. under standard climatic conditions were determined on a specimen of thickness 3 mm obtained in a similar manner. Melt flow rate at 230° C. with 3.8 kg, and die swell at 220° C. with 5 MPa were also measured. The data obtained are shown in Table 1.

COMPARATIVE EXAMPLE 2

Comparative Example 1 was in essence repeated, but the moulding composition used is commercially obtainable with trade name PLEXIGLAS® zk40 from Evonik Röhm GmbH.

This moulding composition encompassed about 67% by weight of an impact modifier which gives high die swell of the plastics moulding composition (commercially available with trade name PLEXIGLAS® zk50 from Evonik Röhm GmbH), and about 33% by weight of a polymethyl methacrylate whose melt flow rate is about 3 ml per 10 minutes (230° C./3.8 kg).

The properties of the plastics moulding composition were studied using the methods described above, and haze here was likewise evaluated on a moulding of thickness 1 mm. The data obtained are shown in Table 1.

INVENTIVE EXAMPLE 1

Comparative Example 1 was in essence repeated, but Inventive Example 1 used a plastics moulding composition produced by compounding (mixing in the melt) of about 33% by weight of a PMMA moulding composition A) whose melt flow rate was about 21 ml per 10 minutes (commercially available with trade name PLEXIGLAS® POQ62 from Evonik Röhm GmbH) and about 67% by weight of an impact modifier which gives high die swell of the plastics moulding composition (commercially available with trade name PLEXIGLAS® zk50 from Evonik Röhm GmbH).

The properties of the plastics moulding composition were studied using the methods described above, and haze here was likewise evaluated on a moulding of thickness 1 mm. The data obtained are shown in Table 1.

COMPARATIVE EXAMPLE 3

Comparative Example 1 was in essence repeated, but the moulding composition used is commercially obtainable with trade name PLEXIGLAS® zk6BR from Evonik Röhm GmbH.

This moulding composition encompassed about 40% by weight of an impact modifier whose structure has two shells and which is obtainable by emulsion polymerization, and about 60% by weight of a polymethyl methacrylate whose melt flow rate is about 6 ml per 10 minutes (230° C./3.8 kg).

The properties of the plastics moulding composition were studied using the methods described above, and haze here was likewise evaluated on a moulding of thickness 1 mm. The data obtained are shown in Table 1.

COMPARATIVE EXAMPLE 4

Comparative Example 1 was in essence repeated, but the moulding composition used is commercially obtainable with trade name PLEXIGLAS® zk30 from Evonik Röhm GmbH.

This moulding composition encompassed about 50% by weight of an impact modifier which gives high die swell of the plastics moulding composition (commercially available with trade name PLEXIGLAS® zk50 from Evonik Röhm GmbH), and about 50% by weight of a polymethyl methacrylate whose melt flow rate is about 3 ml per 10 minutes (230° C./3.8 kg).

The properties of the plastics moulding composition were studied using the methods described above, and haze here was likewise evaluated on a moulding of thickness 1 mm. The data obtained are shown in Table 1.

INVENTIVE EXAMPLE 2

Comparative Example 1 was in essence repeated, but Inventive Example 2 used a plastics moulding composition produced by compounding (mixing in the melt) of about 50% by weight of a PMMA moulding composition A) whose melt flow rate was about 21 ml per 10 minutes (commercially available with trade name PLEXIGLAS® POQ62 from Evonik Röhm GmbH) and about 50% by weight of an impact modifier which gives high die swell of the plastics moulding composition (commercially available with trade name PLEXIGLAS® zk50 from Evonik Röhm GmbH).

The properties of the plastics moulding composition were studied using the methods described above, and haze here was likewise evaluated on a moulding of thickness 1 mm. The data obtained are shown in Table 1.

TABLE 1

| Property | Unit | Comparative Example 1 | Comparative Example 2 | Inventive Example 1 |
|---|---|---|---|---|
| Charpy impact resistance | [kJ/m$^2$] | 75 | 121 | 113 |
| Light transmittance | [%] | 90.1 | 87.3 | 88.6 |
| Haze | [%] | 1.6 | 1.0 | 0.5 |
| MVR (230° C., 3.8 kg) | [ml/10 min] | 4.5 | 0.8 | 2.2 |
| Die swell | [%] | 11 | 21 | 23 |

TABLE 1-continued

| Property | Unit | Comparative Example 3 | Comparative Example 4 | Inventive Example 2 |
|---|---|---|---|---|
| Charpy impact resistance | [kJ/m$^2$] | 80 | 75 | 68 |
| Light transmittance | [%] | 90.1 | 89.9 | 90.2 |
| Haze | [%] | 1.5 | 1.0 | 0.5 |
| MVR (230° C., 3.8 kg) | [ml/10 min] | 1.6 | 1.1 | 4.7 |
| Die swell | [%] | 11 | 28 | 29 |

The data shown above clearly reveal that haze smaller than 1% could be obtained in specimens of thickness 1 mm only when a constitution according to the invention was used. These data can be achieved independently of the melt flow rate (cf. Comparative Example 1 and Inventive Example 2 and, respectively, Inventive Example 1 and Comparative Example 3).

The invention claimed is:

1. A plastics molding composition, comprising:
    A) a poly(meth)acrylate and
    B) an impact-modified poly(meth)acrylate,
    wherein a die swell of the plastics molding composition is at least 15%, measured at 5 MPa and 220° C. to DIN 54811 (1984),
    a melt flow rate of the poly(meth)acrylate A) is at least 10 mL per 10 minutes, measured to ISO 1133 at 230° C. with a load of 3.8 kg,
    a melt flow rate of the impact-modified poly(meth)acrylate B) is from 0.1 to 5 mL per 10 minutes, measured to ISO 1133 at 230° C. with a load of 10 kg, and
    a melt flow rate of the plastics molding composition is from 1 to 7 mL per 10 minutes, measured to ISO 1133 at 230° C. with a load of 3.8 kg.

2. The composition of claim 1, wherein the impact-modified poly(meth)acrylate B) is obtained in a process comprising polymerizing in a suspension polymerization.

3. The composition of claim 1, wherein the impact-modified poly(meth)acrylate B) is obtained in a process comprising:
    polymerizing a hard phase monomer to produce a hard phase comprising at least 70% by weight of methyl methacrylate, with a glass transition temperature Tg >25° C., then,
    adding a tough phase monomer, a polymer of which has a glass transition temperature Tg of <25° C., and
    polymerizing the tough phase monomer to produce the tough phase
    wherein polymerizing to produce the hard phase is in the presence of:
    an oil-soluble free-radical initiator and
    an organic sulfur chain transfer agent comprising at least two thiol groups per molecule.

4. The composition of claim 3, wherein a ratio by weight of the hard phase monomer to the tough phase monomer is from 1:0.15 to 1:3.

5. The composition of claim 3, wherein a proportion of the oil-soluble free-radical initiators initiator is from 0.01 to 5% by weight, based on the weight of the hard phase monomer.

6. The composition of claim 1, wherein a proportion of organic sulfur chain transfer agent is from 0.05 to 5% by weight, based on the weight of the hard phase monomer.

7. The composition of claim 1, wherein the melt flow rate of the poly(meth)acrylate A) is at least 15 mL per 10 minutes, measured to ISO 1133 at 230° C. with a load of 3.8 kg.

8. The composition of claim 1, wherein a ratio by weight of the poly(meth)acrylate A) to impact-modified poly(meth)acrylate B) is from 10:1 to 1:10.

9. The composition of claim 1, wherein the polymers of the plastics molding composition have a molecular-weight distribution with at least two maxima, measured by means of GPC.

10. The composition of claim 1, wherein the plastics molding composition comprises:
    from 10 to 50% by weight of the poly(meth)acrylate A) and
    from 40 to 90% by weight of the impact-modified poly (meth)acrylate B).

11. The composition of claim 10, wherein the plastics molding composition comprises:
    from 10 to 50% by weight of the poly(meth)acrylate A),
    from 40 to 90% by weight of the impact-modified poly (meth)acrylate B), and
    from 0 to 30% by weight of additives.

12. The composition of claim 1, wherein the melt flow rate of the plastics molding composition is from 1 to 6 mL per 10 minutes, measured to ISO 1133 at 230° C. with a load of 3.8 kg.

13. The composition of claim 1, wherein an impact resistance of the plastics molding composition measured at 23° C. to ISO 179 is at least 60 kJ/m$^2$.

14. A molding, comprising the plastics molding composition of claim 1.

15. The molding of claim 14, wherein a thickness of the molding is from 0.5 to 1.5 mm.

16. The molding of claim 14, wherein a haze of the molding, for a thickness of 1 mm, is at most 1% measured to ASTM D 1003 at 23° C.

17. The composition of claim 1, wherein the poly(meth)acrylate A) is obtained by polymerizing a mixture, the mixture comprising at least 20% by weight of methyl methacrylate, based on a total weight of monomer in the mixture.

* * * * *